(12) United States Patent
Kao

(10) Patent No.: US 7,492,611 B2
(45) Date of Patent: Feb. 17, 2009

(54) INTELLIGENT POWER-SUPPLYING DEVICE

(75) Inventor: Golden-city Kao, Banqiao (TW)

(73) Assignee: Michael Wu, Taipei (TW)

( * ) Notice: Subject to any disclaimer, the term of this patent is extended or adjusted under 35 U.S.C. 154(b) by 245 days.

(21) Appl. No.: 11/531,187

(22) Filed: Sep. 12, 2006

(65) Prior Publication Data
US 2006/0279237 A1 Dec. 14, 2006

(30) Foreign Application Priority Data
Jun. 22, 2006 (TW) .............................. 95122550 A

(51) Int. Cl.
*G05F 1/00* (2006.01)
(52) U.S. Cl. ...................................... 363/15; 363/21.01
(58) Field of Classification Search .................. 363/15, 363/20, 21.01, 21.02, 21.04, 21.12, 34
See application file for complete search history.

(56) References Cited

U.S. PATENT DOCUMENTS 5,930,124 A * 7/1999 Otake ........................ 363/21.12
6,577,136 B1 * 6/2003 Marques ..................... 324/426

* cited by examiner

*Primary Examiner*—David Hung Vu

(57) ABSTRACT

An intelligent power-supplying device includes an alternating current (AC) input port, a direct current (DC) input port, a displayer, a reset key and a DC output port. The AC input port receives an AC power while the DC input port receives a DC power. The power-supplying device automatically detects the value of voltage or current required by an electronic device connected to the DC output port thereof. The display shows the value of the voltage or current supplied by the power-supplying device. The power-supplying device automatically starts the process of detecting the voltage or current required by the electronic device when the electronic device is connected to the DC output port thereof.

16 Claims, 9 Drawing Sheets

INTELLIGENT POWER-SUPPLYING DEVICE

FIELD OF THE INVENTION

The present invention generally relates to an intelligent power-supplying device, and more particularly to an intelligent power-supplying device having a function for detecting the power required by an electronic product and adjusting the power output to the same and a method for realizing the detecting function thereof.

BACKGROUND OF THE INVENTION

Electronic products, such as notebook computers, cellular phones, personal digital assistant (PDA) devices and digital music players (for example, Apple iPod and MP3 player) are now made compact for portability. Besides mobile communication services and data/information storage, these portable electronic devices also provide entertainment for general consumers. These devices usually have built-in chargeable batteries and when the batteries run out of power, recharge can be done by electrically connecting a power-supplying device, often particularly designed for the specific portable electronic device, to an external power source, such as an alternating current (AC) power sources, for example a 110V/220V wall outlet, or a direct current (DC) power source, for example a vehicle cigarette lighter adaptor, which is usually of 12V DC.

However, the conventional power-supplying devices are usually designed for specific electronic devices and only supply power to and charge the specific portable electronic device. In other words, hardware interface and output voltage of each type of built-in rechargeable battery can only adapt to a specific electronic product. If a user owns several portable electronic devices, each requiring different input voltage or current, the user has to buy several power-supplying devices for the different portable electronic devices. Thus, the user not only has to spend more money to purchase different power-supplying devices, but also has to carry all these power-supplying devices for charging the electronic devices that are carried with him or her.

Therefore, it is desired to provide a power-supplying device that detects voltage or current required by a connected electronic device and accordingly adjusts the power output to the electronic device, whereby the power-supplying device fits for a variety of different portable electronic devices and provide variable output voltages for these different portable electronic devices, and consequently, supplying adequate powers to different portable electronic devices or charging rechargeable batteries of different specifications can be done with a single power-supplying device.

SUMMARY OF THE INVENTION

An objective of the present invention is to provide an intelligent power-supplying device, which automatically detects the power required by an electronic device connected thereto and accordingly adjusts the power supplied to the electronic device.

Another objective of the present invention is to provide a method for detecting the power required by an electronic device by consecutively providing voltage of different levels to the electronic device to determine the required voltage input of the electronic device.

A further objective of the present invention is to provide an intelligent power-supplying device having a detection-initiation circuit that determines whether an electronic device is connected to the power-supplying device for timely initiating a detection process.

To accomplish the above objectives, the present invention provides an intelligent power-supplying device. The power-supplying device has an alternating current (AC) input port, a direct current (DC) input port, a display, a reset key, and a DC output port. The AC input port receives an AC power while the DC input port receives a DC power. The power-supplying device automatically detects the value of voltage or current required by an electronic device connected to the DC output port thereof. The display shows the voltage or current supplied by the power-supplying device. The power-supplying device automatically starts the process of detecting the voltage or current required by the electronic device when the electronic device is connected to the DC output port thereof. However, the intelligent power-supplying device of the present invention may also allow a user to reset the output power (voltage or current) optionally.

The intelligent power-supplying device of the present invention has a connection cable and a plurality of electrical connectors of different specifications which can be selected according to the power input interfaces of different electronic devices.

The intelligent power-supplying device of the present invention acquires the function of detecting the required voltage or current via the corresponding circuits built therein. The power-supplying device includes an AC-DC conversion circuit, a DC buck-boost circuit and a micro-controller circuit for detecting the voltage or current required by different electronic devices. The AD-DC conversion circuit converts the input AC power into DC power for powering inner circuit of the power-supplying device and for charging the connected electronic devices. The DC buck-boost circuit has an integrated circuit to perform the boosting and bucking function thereof. The micro-controller circuit has a micro-controller unit which detects the changes of the voltage or current output to the electronic device and controls the DC buck-boost circuit to adjust the operations thereof. Furthermore, the micro-controller unit controls the display to display the information of the power currently output, such as the value of the output voltage or current, so that the user can know the information clearly.

The power-supplying device also has detection initiation means which can detect whether the electronic device is electrically connected so as to initiate the process of detecting the voltage or current required by the electronic device. The detection initiation means can be located in an appropriate position within the power-supplying device according to different requirements thereof.

The present invention also provides a method for detecting the power (in the form of either voltage or current) required by different electronic devices and adjusting the voltage or current output to the electronic devices. The method detects the required voltage or current and adjusts the output voltage or current from low levels to high levels in turn according to the corresponding requirement of the electronic device connected to the power-supplying device until an appropriate voltage or current is ascertained. Thus, the electronic device will not be damaged due to an inappropriate voltages possibly output by the power-supplying device thereof.

In the process of detecting the required power by the electronic device, if there is something wrong with the electronic device, for example over-voltage protection, or if the user needs to re-start the process of detecting the required power by the electronic device, the user may press the reset key at any time or separates the electronic device from the intelligent power-supplying device and then re-connect them. Then, the process will be reset.

The intelligent power-supplying device and the method of the present invention can use different electrical connectors with regard to the requirements of the power input interface of different electronic device, which are supposed to be powered or charged by the power-supplying device, and can detect the required voltage or current by the connected electronic device and adjust the output voltage or current from low levels to high levels in turn according to different requirements thereof. Thus, any possible damage, due to any possible inappropriate power input, to the connected electronic device can be avoided. Therefore, the present invention can be used for various portable electronic devices, and relieves the user from the inconveniences of taking several power-supplying devices at the same time as well as saves the costs for purchasing them.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
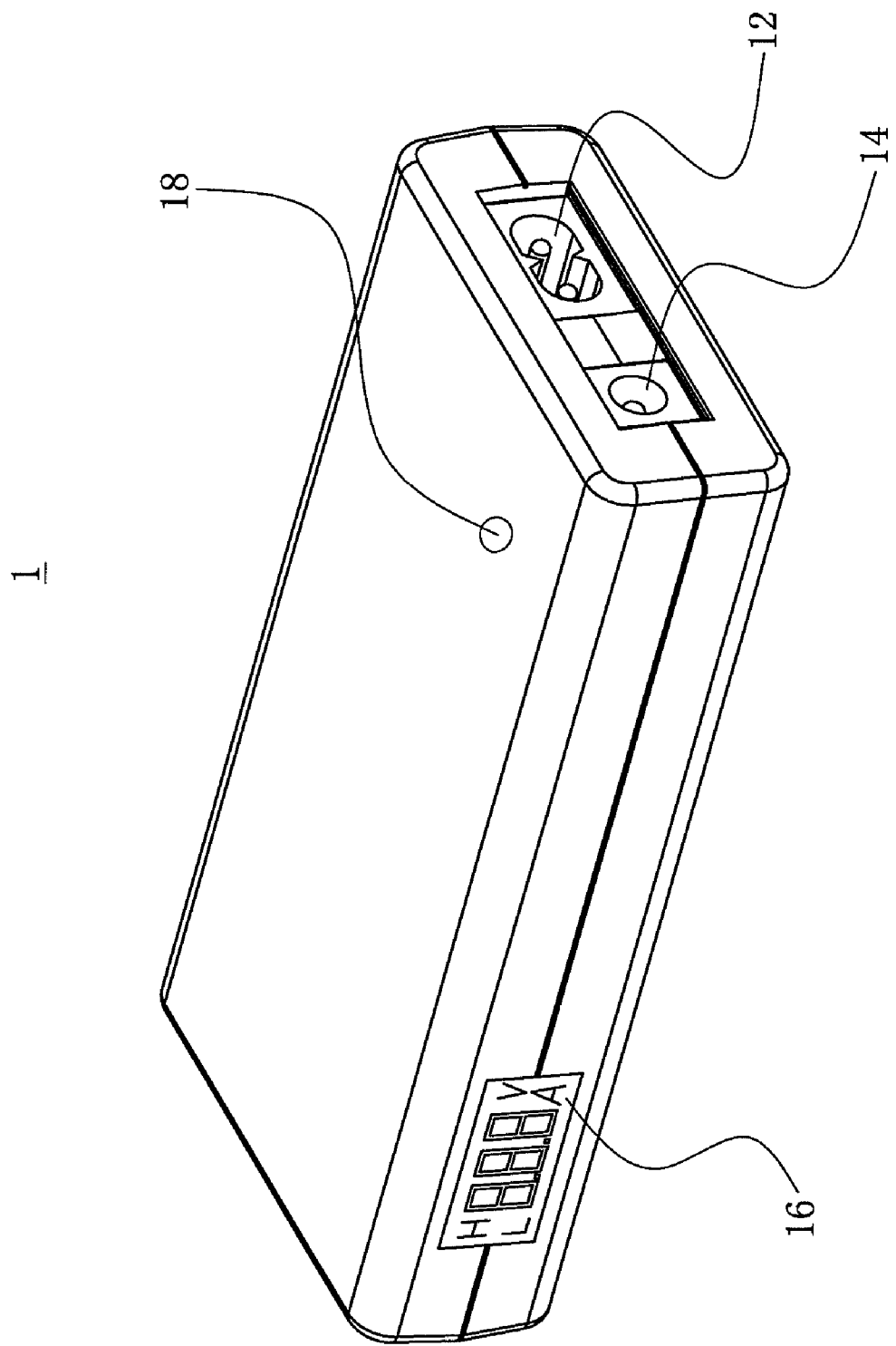
FIG. 1 is a perspective view of an intelligent power-supplying device in accordance with the present invention.
Figure 2:
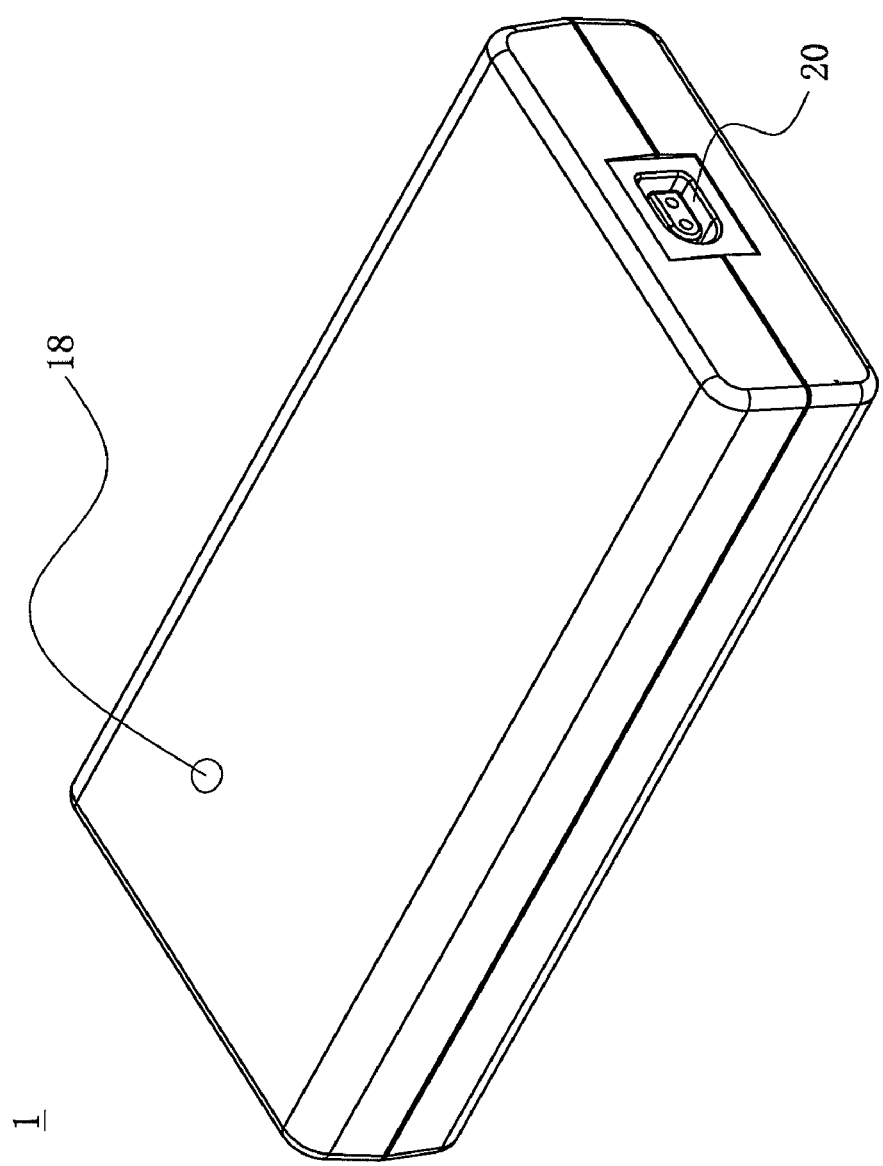
FIG. 2 is another perspective view of the intelligent power-supplying device in accordance with the present invention.

With reference to the drawings and in particular to FIGS. 1 and 2, an intelligent power-supplying device constructed in accordance with the present invention, generally designated with reference numeral 1, comprises an AC input port 12, a DC input port 14, a display 16, a reset key 18 and a DC output port 20. The AC input port 12 can connect to an AC power source (not shown), such as a wall outlet of electric main for receiving AC power therefrom. The DC input port 14 is provided for connection with a DC power source (not shown), such as that commonly available in automobiles, to receive DC power therefrom.

The intelligent power-supplying device 1 can receive both AC and DC power inputs, and automatically detects the type of the input power. Also, the intelligent power-supplying device 1 can detect power (in the form of either voltage or current) required by a specific electronic device (not shown) connected to the DC output port 20 thereof. As a consequence of the detection, the power-supplying device 1 may supply the required voltage or current to the electronic device and shows the output voltage or current on the displayer 16. The displayer 16 can be a liquid crystal display or any other suitable type of displaying device. When an electronic device is connected to the DC output port 20 of the power-supplying device 1 of the present invention, the power-supplying device 1 initiates automatic detection of the required voltage or current for the electronic device. The power-supplying device 1 also provides users with the function of resetting the power output thereof, so that the users may at any time reset the device 1. In other words, when the users actuate the reset key 18, the device 1 re-starts the process of automatic detection of the required voltage or current for the electronic device connected thereto.

Figure 3:
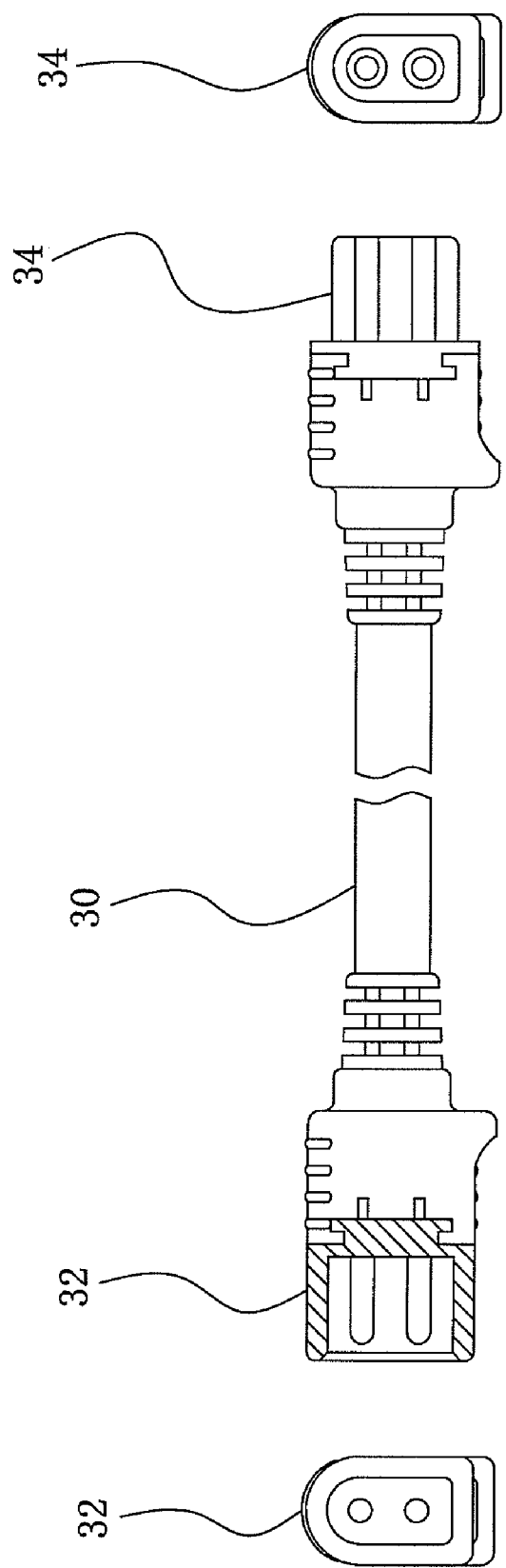
FIG. 3 schematically shows a connection cable of the intelligent power-supplying device in accordance with the present invention in side elevational view and end views.
Figure 4:
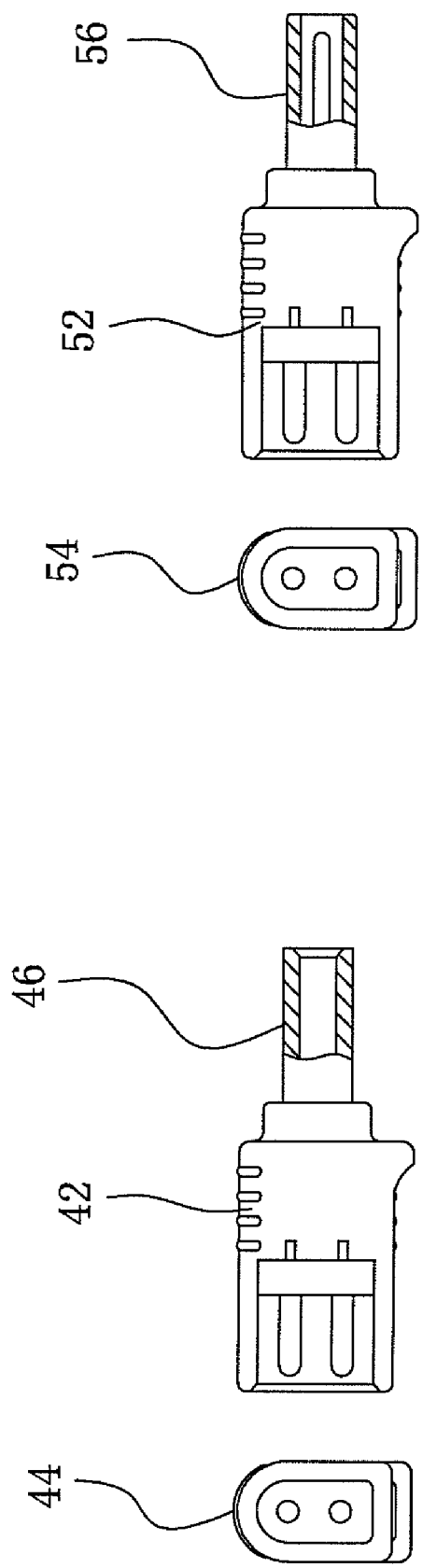
FIG. 4 schematically illustrating, in side elevational view and end view, two electrical connectors for connecting an external electronic device to the intelligent power-supplying device in accordance with the present invention.

Also referring to FIGS. 3 and 4, a connection cable 30 and electrical connectors 42, 52 for the power-supplying device 1 are shown. One end of the connection cable 30 forms a first mating port 32 for connecting to the DC output port 20, and an opposite end forms a second mating port 34 for connecting with either one of the electrical connectors 42, 52. The first mating port 32 is configured to engage the DC output port 20, and the second mating port 34 is configured to engage the electrical connectors 42, 52. It is apparent that the DC output port 20, the first mating port 32, the second mating port 34 and the electrical connectors 42, 52 are illustrated as an example and they can be modified to fit different requirements. Thus, they should not be limited by the structures or sizes as shown in the drawings.

The electrical connectors 42, 52 shown are provided for different applications and they can be interchangeably used with the power-supplying device 1. It is apparent that they are illustrative, rather than limitative. The electrical connector 42 has a first mating end 44 and a second mating end 46. The first mating end 44 is engageable with the second mating port 34 of the connection cable 30 and the second mating end 46 is engageable with a corresponding power input port (not shown) of the electronic device to be connected to the power-supplying device 1.

The electrical connector 52 has a third mating end 54 and a fourth mating end 56. The third mating end 54 is engageable with the second mating port 34 of the connection cable 30 while the fourth mating end 56 is engageable with a corresponding power input port (not shown) of the electronic device to be connected to the power-supplying device 1. Thus, although the connectors 42, 52 are of different types, both are provided with one mating end engageable with the second mating port 34 of the connection cable 30, and the other mating ends of them are designed to have different structures and sizes so as to engage with corresponding mating ports of different electronic devices. Therefore, the power-supplying device 1 of the present invention can mate with corresponding power input interfaces of various electronic devices by using different electrical connectors, and can fulfill the purpose of detecting the required voltage or current by the electronic devices by making use of the auto-detection function thereof just as mentioned above and to be further detailed below.

Figure 5:
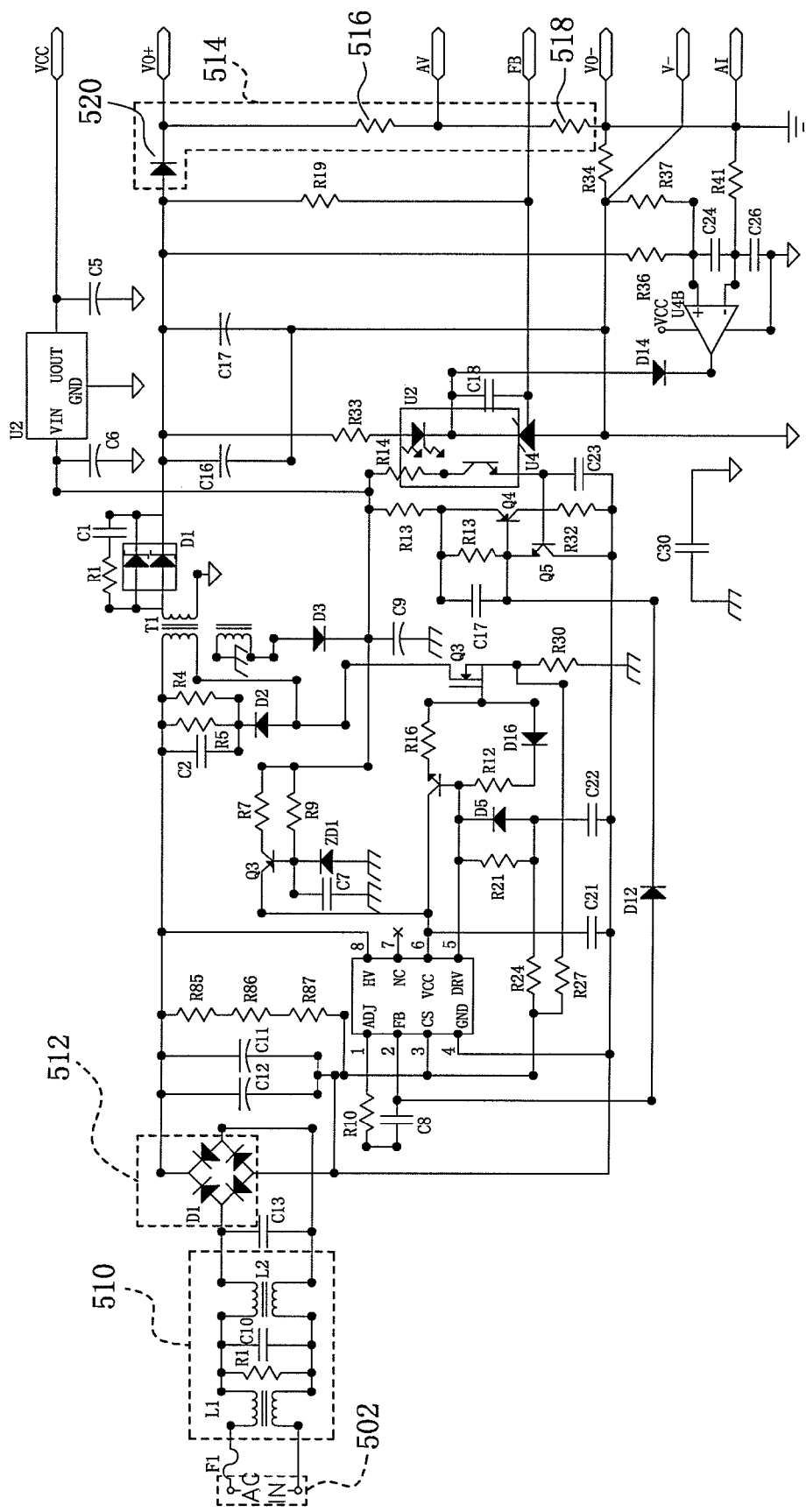
FIG. 5 is a diagram of an AD-DC conversion circuit of the intelligent power-supplying device in accordance with the present invention.
Figure 6:
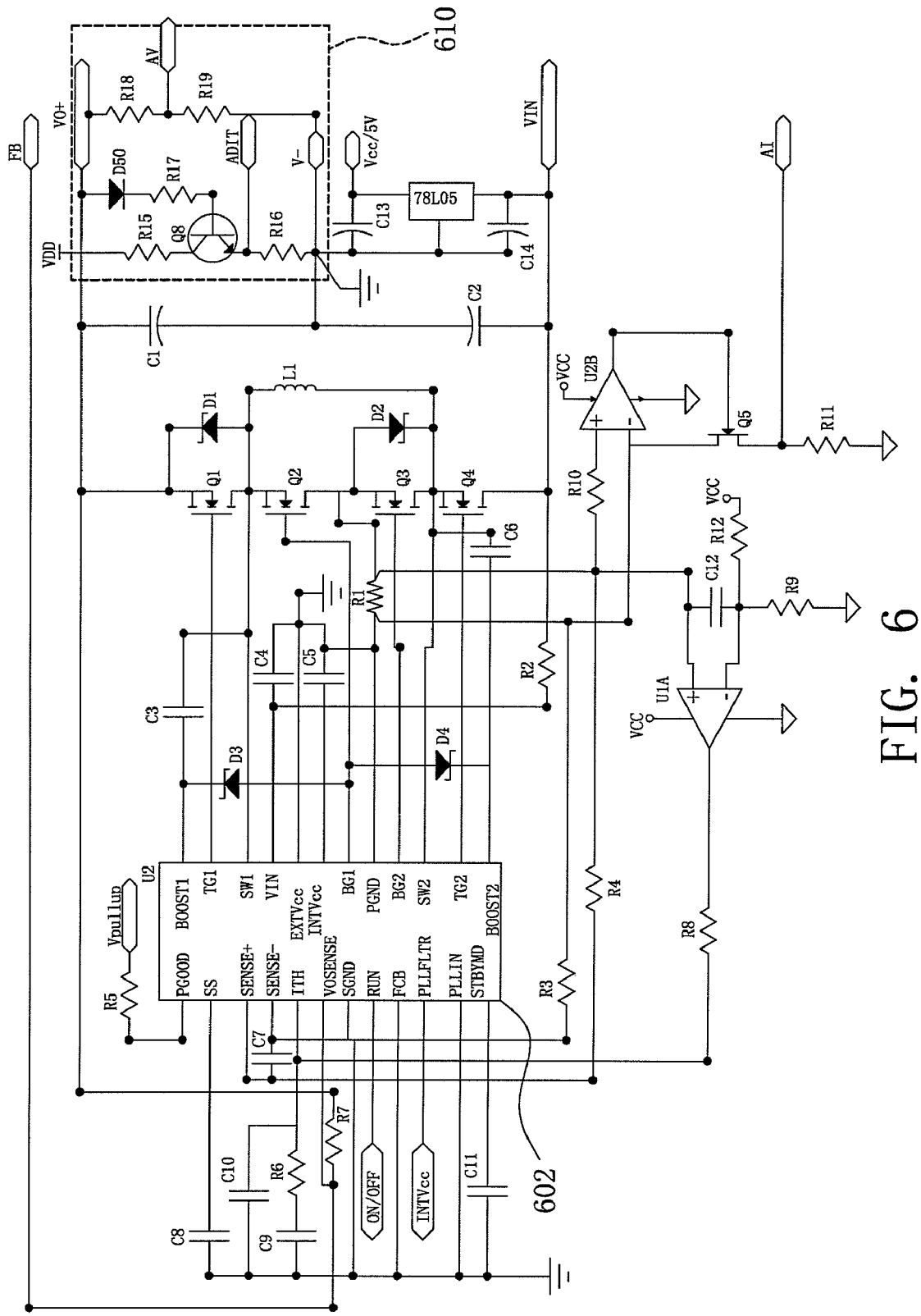
FIG. 6 is a diagram of a DC buck-boost circuit of the intelligent power-supplying device in accordance with the present invention.
Figure 7:
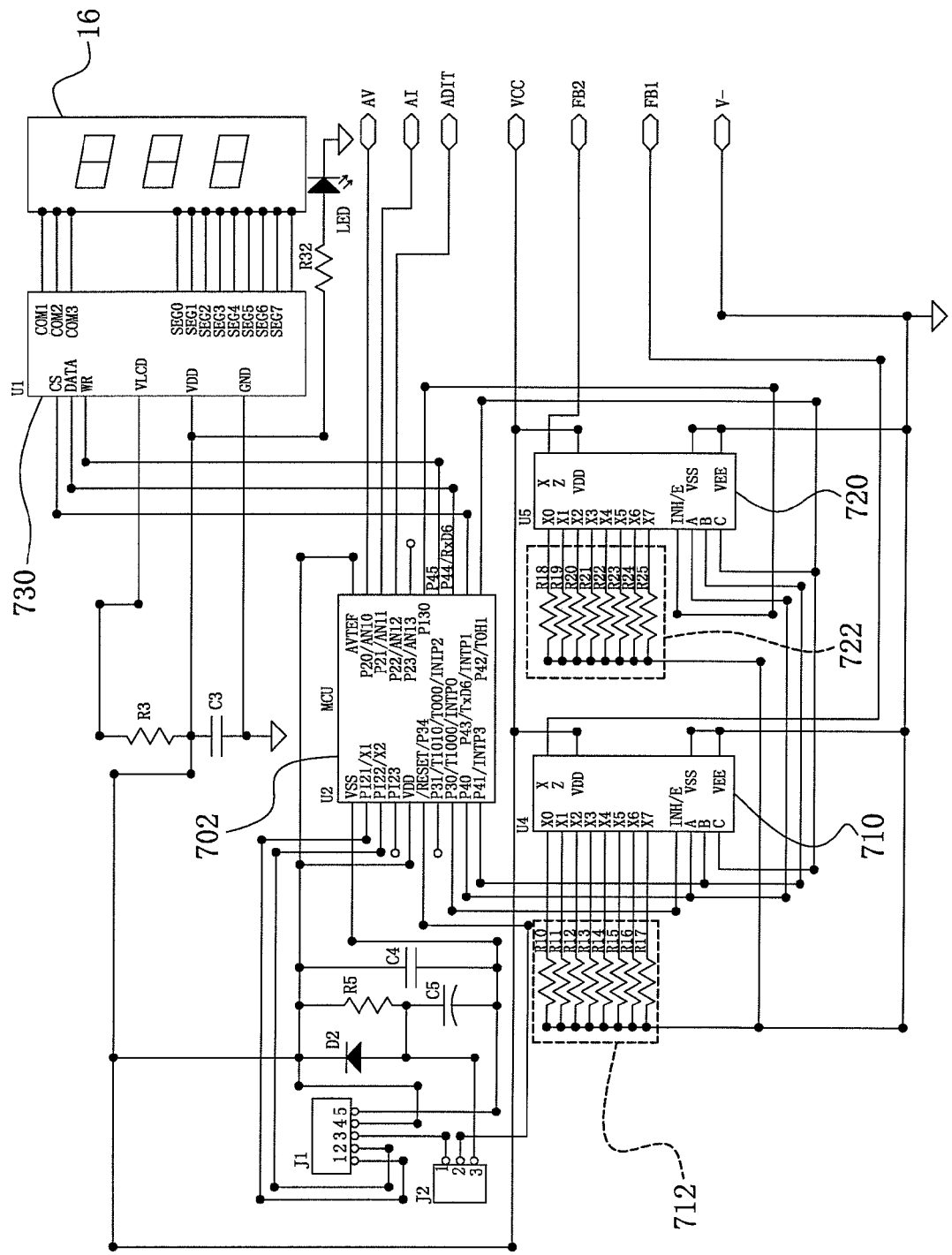
FIG. 7 is a diagram of a micro-controller circuit of the intelligent power-supplying device in accordance with the present invention.

FIGS. 5-7 show circuits of the power-supplying device 1 in accordance with the present invention. FIG. 5 shows a circuit for converting AC power to DC power. When an AC power, such as 110V or 220V AC, is supplied to the power-supplying device 1, the AC power is first fed through AC input terminals 502, which are connected to the AC input port 12, directly or indirectly, to a voltage transformation circuitry 510. The voltage transformation circuitry 510 down converts the input voltage to a lower level and applies the down-converted AC voltage to a rectification circuitry 512. The rectification circuitry 512 receives and processes the AC voltage and provides a DC output voltage, such as 2V or 24V DC, for further processing of up-conversion and/or down-conversion of DC voltage. The AC-DC conversion circuit shown in FIG. 5 also provides a stable DC output voltage as indicated by VCC, which can be for example 5V DC, for powering integrated circuits (not shown) of the power-supplying device 1.

The AC-DC conversion circuit of FIG. 5 may further comprise detection initiation means 514, which is blocked in phantom lines in FIG. 5 and serves to detect if an electronic device is connected to the DC output port 20 that is connected, directly or indirectly, to power output ends VO+ and VO− of the circuit shown in FIG. 5. The detection initiation means 514 comprises two resistors 516, 518 connected in series and a diode 520 connected in parallel to the resistors 516, 518. When the electronic device is electrically connected to the power output ends VO+ and VO−, the voltage output at a voltage detection end AV changes due to the internal impedance of the electronic device. Thus, whether an electronic device is electrically connected to the power output ends VO+ and VO− (or equivalently the DC output port 20 of the power-supplying device 1) can be determined by detecting the change of the output voltage at the voltage detection end AV. After it is determined that an electronic device is connected to the DC output port 20, a process of detecting the voltage or current required by the electronic device can be started.

It is apparent that the detection initiation means 514 may be realized by circuits composed of other electronic/electric elements or devices. For example, the detection initiation means 514 can comprise a combination of resistors and transistors. In addition, the detection of presence of the external electronic device can be done with a current detection end AI, at which an output current is detected. A change of the output current of the current detection end AI indicates the presence of the external electronic device. Further, the detection initiation means may also be arranged in or combined with other circuit blocks of the power-supplying device 1. A different embodiment of the detection initiation means is shown in the circuit of FIG. 6 and indicated by reference numeral 610, which will be further described.

FIG. 6 shows a DC buck-boost circuit of the intelligent power-supplying device 1 in accordance with the present invention. The DC buck-boost circuit comprises a DC buck-boost integrated circuit (IC) 602. The DC output voltage VCC of the above-mentioned AC-DC conversion circuit illustrated in FIG. 5 is connected to and supplied to the DC buck-boost IC 602 via a DC voltage input end INTVCC. The DC voltage VCC is commonly 5V and maintains the normal operation of the DC buck-boost IC 602. The buck-boost IC 602 determines the operation of boosting or bucking the DC voltage thereof based on a feedback signal from a power detection feedback end FB. The DC buck-boost circuit may selectively comprise detection initiation means 610, which has the same function and can replace the detection initiation means 514 of the AC-DC conversion circuit of FIG. 5. In other words, by arranging the detection initiation means 610 in the DC buck-boost circuit, the detection initiation means 514 can be removed from the AC-DC conversion circuit.

The detection initiation means 610 comprises resistors R18, R19 connected in series, and a diode D50 in parallel connection with a transistor Q8. When an electronic device is connected to the DC output port 20, the voltage presenting at a voltage detection end AV changes so that it can be detected that an electronic device is connected to the power-supplying device 1. Similarly, detection of change of current at the current detection end AI may also be employed to determine if an external electronic device is coupled to the power-supplying device 1. Once the detection of the electronic device connected to the power-supplying device 1 is realized, a process of detecting the voltage or current required by the electronic device is started.

The DC buck-boost circuit receives a DC input power via a DC input end VIN thereof and up-conversion or down-conversion of the input DC power is carried to provide an output DC power at the power output ends VO+ and VO− thereof. In the embodiment illustrated, the DC input end VIN of the DC buck-boost circuit receives a DC input in the range of 5V-32V with a maximal input current of 10 A. The range of output voltage at the power output ends VO+ and VO− is 0.8V-30V with a maximal output current of 5 A.

FIG. 7 shows a controlling section of the circuit of that power-supplying device 1 of the present invention, which comprises a micro-controller unit 702. The micro-controller unit 702 can be a microprocessor integrated circuit (IC) based circuit. The micro-controller unit 702 detects variation of the voltage or current supplied to the electronic device connected to the power-supplying device 1, and based on the variation of voltage or current so detected to control the operation of the DC buck-boost circuit of FIG. 6. To operate, the micro-controller unit 702 detects the change or variation of the voltage or current at the voltage detection end AV or the current detection end AI, and selectively controls a first multiplexer 710 and/or a second multiplexer 720 to generate a logic signal corresponding to the change of the voltage or current. The logical signal is applied to the DC buck-boost circuit 602 via the feedback end FB, and, in response thereto, the DC buck-boost circuit 602 performs a corresponding bucking/boosting operation. The micro-controller unit 702 has a plurality of logical ends, each of which can be set in the status of "0" or "1". Thus, the micro-controller unit 702 may selectively provide outputs of different logical signals, based on which the multiplexers 710, 720 are operated to apply the feedback signal to the feedback end FB for controlling the DC buck-boost circuit 602 to adjust output DC voltage thereof. For example, if five logical ends P30, P40, P41, P44 and P45 of the micro-controller unit 702 are used to output corresponding logical signals to the multiplexers 710, 720, then at least 32 different logical signals can be realized ($2^5$=32). Thus, the DC buck-boost circuit 602 can be controlled to output voltages of at least 32 different values. The number of the logical ends of the micro-controller unit 702 can be varied in accordance with practical application requirements, and the number of different levels of output voltage provided by the DC buck-boost circuit 602 varies accordingly.

Each of the multiplexers 710, 720 has a plurality of channels X0-X7, which are connected to resistors comprised of a coupling resistor set 712, 722, respectively. The resistors of the coupling resistor set 712, 722 are of different resistances. The multiplexers 710, 720 conduct on different channels according to the logical signals provided by the micro-controller unit 702, so that the DC buck-boost IC 602 can be selectively coupled to different resistors of the resistor sets 712, 722, which are of different resistances, and thus effecting adjustment of the DC voltage thereof.

A supplemental detection end ADIT may selectively provided in the circuit of the present invention for detecting variations of other signals, such as temperature. This may provides assistance for the detection of variation of voltage or current. In addition, the micro-controller unit 702 controls a display driver 730. The display driver 730 is controlled to drive the display 16 for displaying information associated with the output power of the power-supplying device 1, such as voltage and/or current, so that the user may read and get aware of the power output information of the power-supplying device 1. An example of the display driver 730 is a liquid crystal display (LCD) driver and the display 16 is an LCD.

Figure 8:
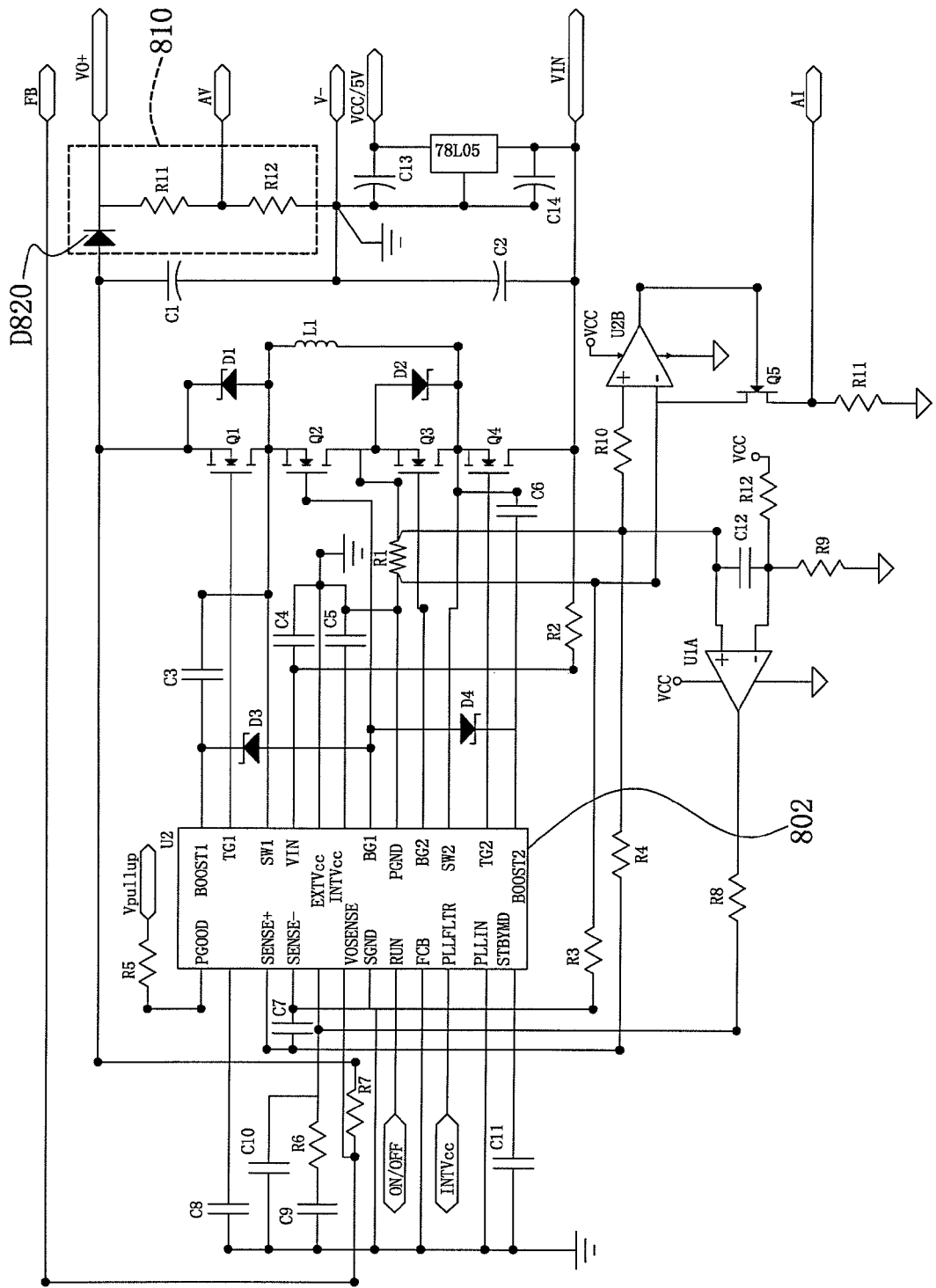
FIG. 8 is a diagram showing another embodiment of the DC buck-boost circuit of the intelligent power-supplying device in accordance with the present invention.

FIG. 8 shows another embodiment of the DC buck-boost circuit of the power-supplying device 1 in accordance with the present invention. A difference between the embodiment of FIG. 8 and the embodiment shown in FIG. 6 resides in that the DC buck-boost circuit of FIG. 8 comprises detection initiation means of which configuration, which is designated with reference numeral 810. The detection initiation means 810 serves for the same purposes as its counterpart detection initiation means 514, 610 discussed previously. In other words, the detection initiation means 810 detects the presence of an external electronic device connected to the power-supplying device 1.

The detection initiation means 810 includes resistors R11, R12 connected in series and a single diode D820 in parallel connection with the two resistors R11, R12. When an electronic device is connected to the power-supplying device 1, the voltage detected at the voltage detection end AV changes and, similar to the previous embodiment, a process of detecting the voltage or current required by the electronic device is initiated. The change of current detected at the current detection end AI can also be used to determine whether an electronic device is connected to the power-supplying device 1 or not and proceeds with the process of detection of the voltage or current required by the electronic device. As an alternative, the single diode D820 may be replaced a plurality of parallel-connected diodes, which effectively lowers the effective overall resistance thereof and thus voltage drop across the diodes to enhance sensitivity for detecting variation of voltage or current at the voltage detection end AV or the current detection end AI. It is apparent that the detection initiation means 810 can replace either one of the previously discussed detection initiations means 514 and 610 to realize the detection purpose thereof.

Figure 9:
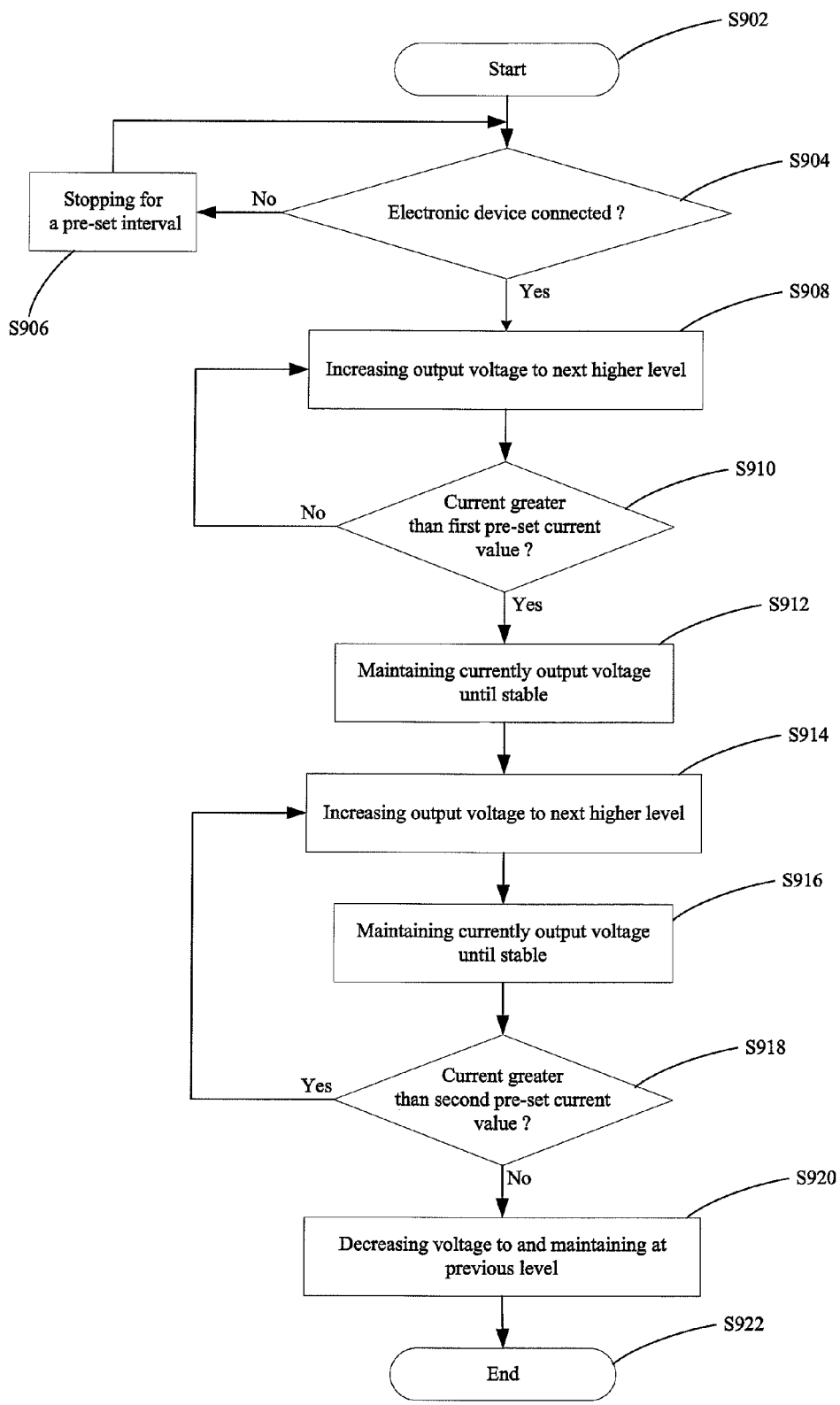
FIG. 9 is a flow chart illustrating the operation of detecting voltage required by an external electronic device connected to the power-supplying device in accordance with the present invention.

Also referring to FIG. 9, the operation of the power-supplying device 1 of the present invention to detect the voltage required by the electronic device connected to the power-supplying device 1 in accordance with the present invention includes the following steps:

Step S902: The power-supplying device 1 starts with a standby mode, in which the power-supplying device 1 provides a test voltage, which is a DC voltage having a minimal value of 1.5V for the standby situation.

Step S904: The detection initiation means 514, 610 or 810 operates to detect whether an electronic device is connected to the power-supplying device 1. When an electronic device is coupled to the power-supplying device, the internal impedance of the electronic device is connected to the resistance of the detection initiation means 514, 610 or 810 and, under the condition that the test voltage is provided by the power-supplying device 1, electrical current flows through the detection initiation means changes. The micro-controller unit 702 detects the change of the current at the current detection end AI and determines if the connection between the external electronic device and the power-supplying device 1 is made by comparing the variation of level of the current with a first preset current value. If the variation of the current is greater than the first pre-set current, it is determined that the connection between the external electronic device and the power-supplying device 1 has been established; otherwise, it is determined that no external electronic device is connected to the power-supplying device 1. The first pre-set current value may be 1.5 mA. Alternatively, the micro-controller unit 702 may detect the variation of voltage at the voltage detection end AV to determine if an electronic device is connected to the power-supplying device 1. Taking the detection initiation means 514 of the circuit illustrated in FIG. 5 as an example, when an electronic device is connected to the power-supplying device 1, the internal impedance of the electronic device is considered in parallel connection with the serially connected resistors 516, 518 of the detection initiation means 514, and voltage between the resistors 516, 518 changes. The voltage detected at the voltage detection end AV changes accordingly. For example, the voltage value detected at the voltage detection end AV is 500 mV when there is no electronic device connected to the power-supplying device 1, while the voltage value detected at the voltage detection end AV drops when an electronic device is connected to the power-supplying device 1. If the value of the voltage change as detected is smaller than a first pre-set voltage value, it is determined that the connection has been established between the electronic device and the power-supplying device 1. The first pre-set voltage value may be 30 mV, for example. As other alternatives, the micro-controller unit 702 may detect changes or variation of signals representing other physical quantities, such as temperature, via the supplemental detection end ADIT to realize the same purpose as above. If it is determined that an electronic device is connected to the power-supplying device 1, then the operation goes on to Step S908, otherwise goes to Step S906.

Step S906: When no electronic device is connected to the power-supplying device 1 as detected in step S904, the power-supplying device 1 stops the supply of the output voltage for a preset interval of time and then the operation goes back to Step S904. The pre-set interval may be 2 seconds.

Step S908: In case an electronic device is connected to the power-supplying device 1, in response to the detection of the electronic device of Step S904, the micro-controller unit 702 controls the DC buck-boost circuit 602 to raise the output level of the test voltage by a preset amount and supplies the test voltage to the electronic device. The output level of the test voltage can be increased in a step by step manner, and each step is associated with a preset amount of increment of voltage. The levels of the test voltage can be pre-established in the circuit of the power-supplying device 1 or can be generated and defined in any known means. Thus, each time an increment of the output level of the test voltage is desired, the test voltage is raised to the next step.

Step S910: With the supply of the incremented test voltage, the power-supplying device 1 detects whether the current value at the current detection end AI is greater than the first pre-set current value by the micro-controller unit 702. If the detected current value is greater than the first pre-set current value, then the operation goes on to S912; otherwise, the operation goes back to step S908 for further increment of the test voltage.

Step S912: Under the control of the micro-controller unit 702, the currently supplied output level of the test voltage provided by the DC buck-boost circuit 602 is maintained for a period of time until the current value at the current detection end AI becomes steady. The period of time for maintaining the output voltage can be set to 2 seconds.

Step S914: The output level of the test voltage is then further increased to the next higher level by the DC buck-boost circuit 602 under the control of the micro-controller unit 702.

Step S916: Again, the currently supplied output level of the test voltage is maintained for a period of time until the current value at the current detection end AI becomes steady. The period of time for maintaining the output voltage can be set to 2 seconds.

Step S918: The micro-controller unit 702 detects the value of current at the current detection end Al and determines if the value is greater than a second pre-set current value. If the value of the current at the current detection end Ai is greater than the second pre-set current value, it determines that the next level of the test voltage may be more suitable for the specific electronic device; otherwise, it determines that the output voltage of the previous level is proper for the electronic device. The second pre-set current value may be selected among the range of 100 mV-200 mV. If the value of the current at the current detection end AI is greater than the second pre-set current value, the operation goes back to Step S914; otherwise it goes on to Step S920.

Step S920: The micro-controller unit 702 controls the DC buck-boost circuit 602 to switch the output of the test voltage back to the previous level and maintaining and continuously supplying the voltage value to the electronic device.

Several experiments have been taken for different electronic devices to illustrate the operation of the intelligent power-supplying device 1 of the present invention and the results of the experiments are given below. The output levels of the test voltage can be set according to practical applications.

| Output Level of Test Voltage | Displayed current value |
|---|---|
| Experiment 1: Mobile Phone-Motorola A768 | |
| 1.5 V | 2 mA |
| 3.0 V | 4 mA |
| 4.2 V | 5-6 mA |
| 5.0 V | 746 mA (continually increasing to a stable value) |
| 6.0 V | 758 mA (returning to the previous level as the change of current is less than 100 mA) |
| Maintaining 5.0 V | 745 mA |
| Experiment 2: Mobile Phone-Motorola V66 | |
| 1.5 V | 0 mA |
| 3.0 V | 2 mA |
| 4.2 V | 0-150 mA (continually increasing to a stable value) |
| 5.0 V | 150-160 mA (continually increasing to a stable value) |
| 6.0 V | 280 mA (returning to the previous level as the change of current is less than 150 mA) |
| Maintaining 5.0 V | 160 mA |
| Experiment 3: Notebook Computer-Dell 510M | |
| 1.5 V | 1 mA |
| 3.0 V | 1 mA |
| 4.2 V | 1 mA |
| 5.0 V | 2 mA |
| 6.0 V | 2 mA |
| 8.4 V | 3 mA |
| 10 V | 3 mA |
| 12 V | 4 mA |
| 15 V | 1.0 A (Current value is fluctuating) |
| 16 V | 1.1 A (Current value is fluctuating) |
| 17 V | 1.1 A (Current value is fluctuating and charging indicator of the computer indicates battery of the computer is being charged, but actually the current is not sufficient to charge the battery and is only sufficient to support operation of the computer) |
| 18 V | 2.0 A (Current value is still fluctuating and charging of the computer battery is started) |
| 19 V | 2.5 A |
| 20 V | 2.4 A (returning to the previous level as the change of current is less than 150 mA) |
| Maintaining 19 V | 2.5 A |

From the experiment results listed above, it is concluded that the intelligent power-supplying device 1 of the present invention can detect the required voltage or current by performing a series of detecting, comparing and adjusting steps in turn according to the specific requirements of different electronic products. Thus, the electronic device will not be damaged due to an inappropriate voltage possibly supplied from the device 1.

In the process of detecting the voltage or current required by the electronic device, if there is something wrong with the electronic device, such as over-loading protection, or if the user wishes to restart the process, the user may actuate the reset key 18 at any time, or disconnect the electronic device from the power-supplying device 1 to thereby reset the process. The test voltage or output voltage that is supplied to the electronic device is always incremented in a step by step manner from a lowest value to a highest value that is proper for charging or powering the electronic device so that damage caused on the electronic device due to over-voltage (or over-current) can be effectively prevented.

As illustrated above, the intelligent power-supplying device 1 and the method of detecting the required voltage by an electronic device connected to the device 1 in accordance with the present invention can adopt different electrical connectors to connect with different power input interfaces of the electronic device. The power-supplying device 1 and the method thereof can detect the required voltage from lower voltage levels to higher voltage levels according to corresponding requirements of different electronic devices thereby avoiding any possible damage to the electronic device due to an inappropriate voltage output to the electronic device.

Therefore, the present invention can be used for various portable electronic devices, and saving the user the inconveniences of carrying several power-supplying devices at the same time as well as expenses for purchasing different power-supplying devices. The intelligent power-supplying device 1 of the present invention can be applied to various portable electronic device, such as notebook computers, mobile phones, personal digital assistants (PDAs), and digital music players, for example MP3 player and Apple iPod.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A power-supplying device, to which an electronic device is connectable for charging or powering, the power-supplying device detecting and supplying operation voltage required by the electronic device, the power-supplying device comprising:

a power input port for receiving input power from an external power source;

an output port for supplying output power to the electronic device;

a buck-boost circuit for selectively boosting and bucking the input power and thus supplying the output power;

a controller circuit selectively initiating a detection process for detecting the operation voltage of the electronic device and controlling the buck-boost circuit to make the output power corresponding to the operation voltage of the electronic device; and detection initiation means that detects presence of the electronic device electrically connected to the power-supplying device in order to allow the controller circuit to initiate the detection process.

2. The power-supplying device as claimed in claim 1, wherein the power input port selectively comprises an alternating current (AC) input port for receiving an AC power and a direct current (DC) input port for receiving a DC power.

3. The power-supplying device as claimed in claim 2 further comprising an AC-DC conversion circuit for conversing the input AC power DC power and supplying the converted DC power to the buck-boost circuit for further processing.

4. The power-supplying device as claimed in claim 1 further comprising a display for displaying data related to the output power.

5. The power-supplying device as claimed in claim 4, wherein the data shown by on the display includes current and voltage.

6. The power-supplying device as claimed in claim 4, wherein the display comprises a liquid crystal display.

7. The power-supplying device as claimed in claim 1 further comprising a connection cable and an electrical connectors for electrically connecting the electronic device to the power-supplying device; the connection cable having a first mating port for engaging the output port of the power-supplying device and a second mating port for selectively engaging the electrical connectors, the electrical connectors each having a third mating end for engaging the second mating port of the connection cable and a fourth mating end for engaging a corresponding power input interface of the electronic device, the fourth mating ports of the electrical connectors being of different specifications corresponding to the power input interfaces of different electronic device selectively connectable to the power-supplying device.

8. The power-supplying device as claimed in claim 1, wherein the buck-boost circuit comprises a DC voltage buck-boost integrated circuit for selectively bucking and boosting the input power.

9. The power-supplying device as claimed in claim 1, wherein the controller circuit comprises a micro-controller unit for selectively detecting changes of current or voltage supplied to the electronic device and controlling the buck-boost circuit.

10. The power-supplying device as claimed in claim 9, wherein the micro-controller unit comprises a microprocessor integrated circuit.

11. The power-supplying device as claimed in claim 9, wherein the controller circuit comprises at least one multiplexer for receiving signals from the micro-controller unit thereby controlling the buck-boost circuit to adjust the output power.

12. The power-supplying device as claimed in claim 1, wherein the detection initiation means comprises at least two resistors connected in series with a diode, the controller circuit detecting variation of voltage and/or current at a point between the resistors to detect the presence of the electronic device connected to the power-supplying device.

13. The power-supplying device as claimed in claim 1, wherein the detection initiation means comprises at least two resistors connected in series and a diode and a transistor in parallel connection therewith, the controller circuit detecting variation of voltage and/or current at a point between the resistors to detect the presence of the electronic device connected to the power-supplying device.

14. The power-supplying device as claimed in claim 1, wherein the detection initiation means comprises at least two resistors connected in series and a diode connected in parallel thereto, the controller circuit detecting variation of voltage and/or current at a point between the resistors to detect the presence of the electronic device connected to the power-supplying device.

15. The power-supplying device as claimed in claim 1, wherein the detection initiation means comprises at least two resistors connected in series and a plurality of diodes connected in parallel thereto, the controller circuit detecting variation of voltage and/or current at a point between the resistors to detect the presence of the electronic device connected to the power-supplying device.

16. The power-supplying device as claimed in claim 1 further comprising a reset key for resetting the operation of the controller circuit.

* * * * *